US011378526B2

(12) United States Patent
Saito et al.

(10) Patent No.: US 11,378,526 B2
(45) Date of Patent: Jul. 5, 2022

(54) FAULTED CONDITION DETERMINATION DEVICE AND FAULTED CONDITION DETERMINATION METHOD

(71) Applicants: MITSUBISHI HEAVY INDUSTRIES, LTD., Tokyo (JP); National Institute for Materials Science, Ibaraki (JP)

(72) Inventors: Nobuhiko Saito, Tokyo (JP); Nobuyoshi Komai, Tokyo (JP); Yuichi Hirakawa, Tokyo (JP); Hiroaki Fukushima, Tokyo (JP); Kota Sawada, Ibaraki (JP); Kazuhiro Kimura, Ibaraki (JP); Kaoru Sekido, Ibaraki (JP)

(73) Assignees: MITSUBISHI HEAVY INDUSTRIES, LTD., Tokyo (JP); NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 662 days.

(21) Appl. No.: 16/269,936

(22) Filed: Feb. 7, 2019

(65) Prior Publication Data

US 2019/0250110 A1 Aug. 15, 2019

(30) Foreign Application Priority Data

Feb. 14, 2018 (JP) .............................. JP2018-024540

(51) Int. Cl.
*B23K 31/12* (2006.01)
*G01N 23/04* (2018.01)
(Continued)

(52) U.S. Cl.
CPC .............. *G01N 23/04* (2013.01); *B23K 31/12* (2013.01); *B23K 2103/04* (2018.08);
(Continued)

(58) Field of Classification Search
None
See application file for complete search history.

(56) References Cited

U.S. PATENT DOCUMENTS 5,781,602 A * 7/1998 Fero .................. B23K 31/12
376/159
6,476,624 B1 * 11/2002 Chuman ............... G01N 27/20
324/522
(Continued)

FOREIGN PATENT DOCUMENTS

| CN | 106624416 A | * | 5/2017 |
| JP | 2003-90506 | | 3/2003 |
| JP | 5783553 | | 9/2015 |

OTHER PUBLICATIONS

King et al., "Austenitic-Ferritic Steel Weld Joint Failures", Welding Research Supplement, Welding Journal, 1982, p. 302-308 (Year: 1982).*

*Primary Examiner* — Devang R Patel
(74) *Attorney, Agent, or Firm* — Wenderoth, Lind & Ponack, L.L.P.

(57) ABSTRACT

A faulted condition determination method is designed to detect a chromium content and a nickel content in a predetermined boundary region proximate to a boundary between a high-strength ferrite steel and a weld material in a welded joint in which the high-strength ferrite steel and another steel are welded together using the weld material containing nickel and to thereby determine the faulted condition of the predetermined boundary region based on the chromium content and the nickel content. Accordingly, it is possible to appropriately determine the faulted condition of welding of a replacement part in which a high-strength ferrite steel and another steel are welded together using a nickel-based weld material.

9 Claims, 9 Drawing Sheets

(51) Int. Cl.
    *B23K 103/04*     (2006.01)
    *G01N 23/2206*     (2018.01)
    *G01N 23/2251*     (2018.01)
    *G01N 23/2273*     (2018.01)
    *G01N 23/20*     (2018.01)

(52) U.S. Cl.
    CPC ......... *G01N 23/20* (2013.01); *G01N 23/2206* (2013.01); *G01N 23/2251* (2013.01); *G01N 23/2273* (2013.01); *G01N 2223/629* (2013.01); *G01N 2223/646* (2013.01)

(56) References Cited

U.S. PATENT DOCUMENTS

| | | | |
|---|---|---|---|
| 6,486,439 B1* | 11/2002 | Spear | B23K 9/1062 |
| | | | 219/136 |
| 7,030,334 B1* | 4/2006 | Ruiz | B23K 11/11 |
| | | | 219/109 |
| 9,739,412 B2* | 8/2017 | Watanabe | G01N 17/00 |
| 9,873,164 B2* | 1/2018 | Toyoda | F16L 9/02 |
| 10,443,787 B2* | 10/2019 | Bovero | F16L 55/18 |
| 2003/0058991 A1* | 3/2003 | Lott | G01N 23/04 |
| | | | 378/60 |

* cited by examiner

FIG. 6A
FIG. 6B
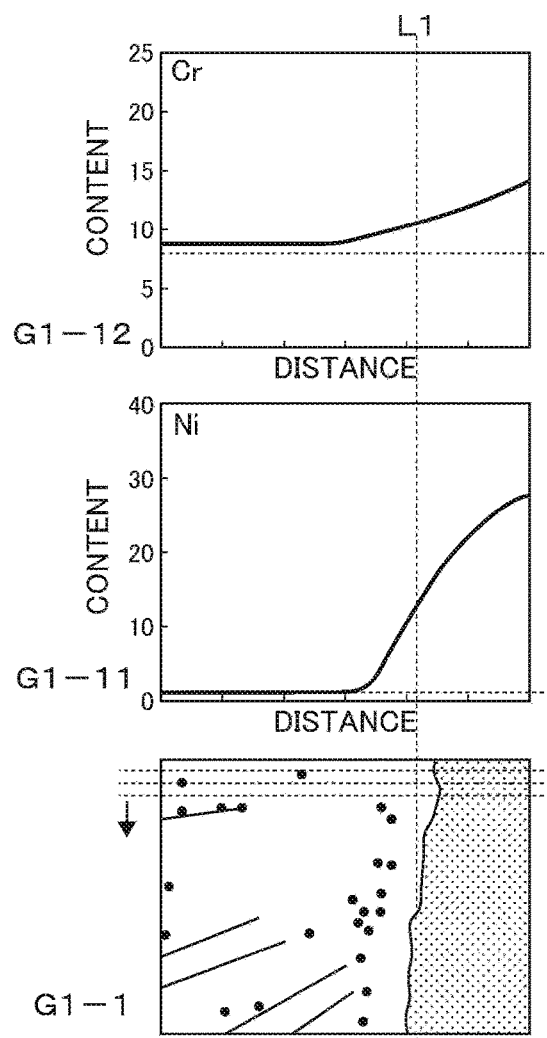
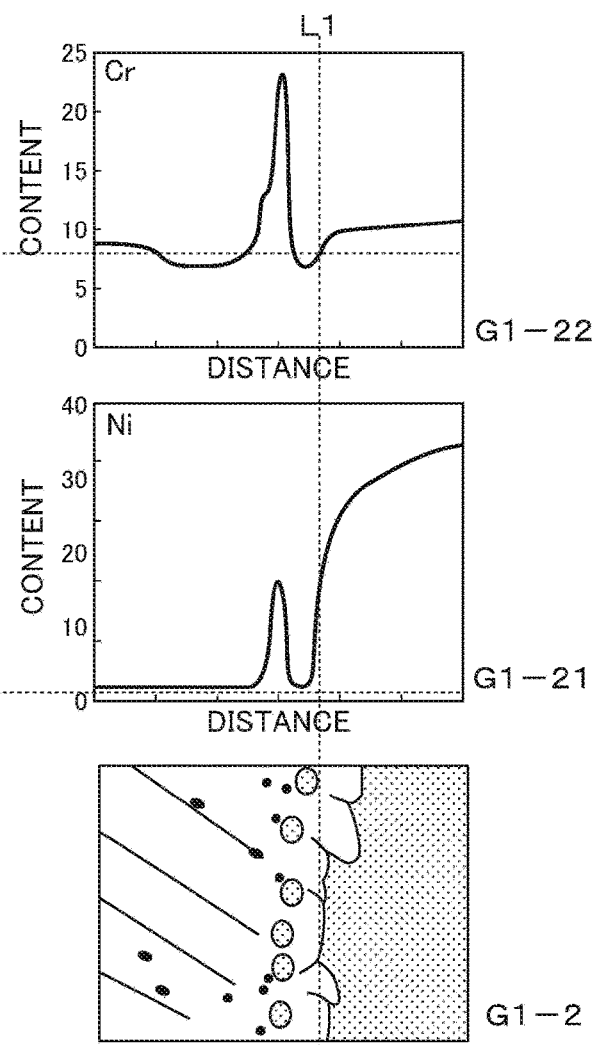

FIG. 8

| FAULTED CONDITION | PRECIPITATION IN PREDETERMINED BOUNDARY REGION | FERRITE BAND | CREEP VOID | CHROMIUM CONTENT | NICKEL CONTENT |
|---|---|---|---|---|---|
| FIRST STAGE | CARBIDE | ABSENT | ABSENT | 8.0% OR ABOVE | BELOW 0.4% |
| SECOND STAGE | CARBIDE, INTERMETALLIC COMPOUND (CARBIDE AREA ≧ INTERMETALLIC COMPOUND AREA) | EMERGE (SLIGHT) | | | |
| THIRD STAGE | | GROW/ENLARGE | EXIST | BELOW 8% | 0.4% OR ABOVE |
| FOURTH STAGE | CARBIDE, INTERMETALLIC COMPOUND (CARBIDE AREA < INTERMETALLIC COMPOUND AREA) | | | | |

| MATERIAL | | C | Si | Mn | P | S | Ni | Cr | Mo | V | Nb | Nb+Ta | N | Al | Ti | Cu | Fe |
|---|---|---|---|---|---|---|---|---|---|---|---|---|---|---|---|---|---|
| 9% Cr STEEL | Min | 0.08 | 0.20 | 0.30 | - | - | - | 8.0 | 0.85 | 0.18 | 0.06 | - | 0.030 | - | - | - | - |
| | Max | 0.12 | 0.50 | 0.60 | 0.020 | 0.010 | 0.40 | 9.5 | 1.05 | 0.25 | 0.10 | - | 0.070 | 0.04 | - | - | - |
| Ni-BASED WELD MATERIAL | Min | - | - | 2.50 | - | - | 67.0 | 18.0 | - | - | - | 2.0 | - | - | - | - | - |
| | Max | 0.10 | 0.50 | 3.50 | 0.030 | 0.015 | - | 22.0 | - | - | - | 3.0 | - | - | 0.75 | 0.50 | 3.0 |

FAULTED CONDITION DETERMINATION DEVICE AND FAULTED CONDITION DETERMINATION METHOD

CROSS-REFERENCE TO RELATED APPLICATION

The present application claims the priority benefit of Japanese Patent Application No. 2018-24540 filed on Feb. 14, 2018, the subject matter of which is hereby incorporated herein by reference.

BACKGROUND OF THE INVENTION

1. Field of the Invention

The present invention relates to a faulted condition determination device and a faulted condition determination method.

2. Description of Related Art

Replacement parts such as piping used under high-temperature environments of boilers may have replacements parts such as piping made up of high-strength ferrite steels and other steel materials, which are welded together using weld materials containing nickel. Specifically, replacement parts such as piping may include welding of high-strength ferrite steels and austenitic stainless steels, which are welded together using nickel-based weld materials. Conventionally, maintenance should be required for replacement parts. Patent Literature Document 1 (Japanese Patent Application Publication No. 2003-90506) discloses the related art, which aims to assess fault degrees and remaining lives of welding by evaluating cracks occurring in weld joints of different materials for small-diameter pipes made up of ferrite CrMo steels and austenitic stainless steels.

Accordingly, it is necessary for maintenance technologies to appropriately determine faults occurring in proximity to welding of replacement parts such as piping in which welding of high-strength ferrite steels and austenitic stainless steels are welded together using nickel-based weld materials.

The present invention aims to provide a faulted condition determination device and a faulted condition determination method to solve the above problem.

SUMMARY OF THE INVENTION

In a first aspect of the invention, a faulted condition determination method is adapted to a welded joint in which a high-strength ferrite steel and another steel are welded together using a weld material containing nickel. The faulted condition determination method includes: detecting a chromium content and a nickel content in a predetermined boundary region proximate to a boundary between the high-strength ferrite steel and the weld material; and determining a faulted condition of the predetermined boundary region based on the chromium content and the nickel content.

The faulted condition determination method may further include: detecting the chromium content and the nickel content in the predetermined boundary region, which are measured in the high-strength ferrite steel of the welded joint; determining the faulted condition as a replacement standby state to stand by replacement of a replacement part when the chromium content is equal to a first lower threshold or more while the nickel content is less than a second lower threshold; and determining the faulted condition as a replacement consideration state to consider replacement of the replacement part when the chromium content is less than the first lower threshold while the nickel content is equal to the second lower threshold or more.

In the faulted condition determination method, the replacement standby state is classified into at least two faulted conditions. For example, the replacement standby state is classified into at least two faulted conditions among a faulted condition representing the replacement part subjected to longitudinal observation, a faulted condition representing the replacement part subjected to inspection on the next periodical inspection, and a faulted condition to consider replacement of the replacement part on the next periodical inspection.

The faulted condition determination method may further include: acquiring an image including the predetermined boundary region; calculating a precipitate region representing an occupied region of interfacial precipitation in the predetermined boundary region; and determining the faulted condition of the predetermined boundary region based on the precipitate region.

The faulted condition determination method may further include: calculating a carbide area representing an occupied region of carbides in the predetermined boundary region and an intermetallic compound area representing an occupied region of intermetallic compounds in the predetermined boundary region based on the image; and determining the faulted condition of the predetermined boundary region based on the carbide area and the intermetallic compound area.

The faulted condition determination method may further include: comparing the carbide area and the intermetallic compound area; determining the replacement standby state when the carbide area is equal to or larger than the intermetallic compound area; and determining the replacement consideration state when the carbide area is smaller than the intermetallic compound area.

In the faulted condition determination method, it is possible to determine the faulted condition of the predetermined boundary region based on growth of ferrite bands detected from the image. Alternatively, it is possible to determine the faulted condition of the predetermined boundary region based on absence/existence of creep voids in the predetermined boundary region detected from the image.

Moreover, the faulted condition determination method may further include: detecting the chromium content and the nickel content in a first boundary region apart from the boundary by a first distance; detecting carbides and intermetallic compounds in a second boundary region apart from the boundary by a second distance smaller than the first distance; and detecting creep voids in a third boundary region apart from the boundary by a third distance equal to the first distance.

In a second aspect of the invention, a faulted condition determination device is adapted to a welded joint in which a high-strength ferrite steel and another steel are welded together using a weld material containing nickel. The faulted condition determination device includes a content detector configured to detect a chromium content and a nickel content in a predetermined boundary region proximate to a boundary between the high-strength ferrite steel and the weld material; and a faulted condition determination part configured to determine a faulted condition of the predetermined boundary region based on the chromium content and the nickel content.

In a third aspect of the invention, a computer-readable storage medium has stored therein a program causing a computer to implement: a process of detecting a chromium content and a nickel content in a predetermined boundary region proximate to a boundary between a high-strength ferrite steel and a weld material in a welded joint in which the high-strength ferrite steel and another steel are welded together using the weld material containing nickel; and a process of determining a faulted condition of the predetermined boundary region based on the chromium content and the nickel content.

According to the present invention, it is possible to appropriately determine the faulted condition of welding of a replacement part in which a high-strength ferrite steel and another steel are welded together using a nickel-based weld material.

BRIEF DESCRIPTION OF THE DRAWINGS

FIG. 6A shows analysis results of a TEM image G1-1.

FIG. 6B shows analysis results of a TEM image G1-2.

FIG. 8 shows a classification table showing various stages of faulted conditions.

FIG. 11 shows chemical compositions of a high-strength ferrite steel and a nickel-based weld material.

DETAILED DESCRIPTION OF THE EMBODIMENTS

The present invention will be described in detail with respect to a faulted condition determination device and a faulted condition determination method with reference to the accompanying drawings.

Figure 1:
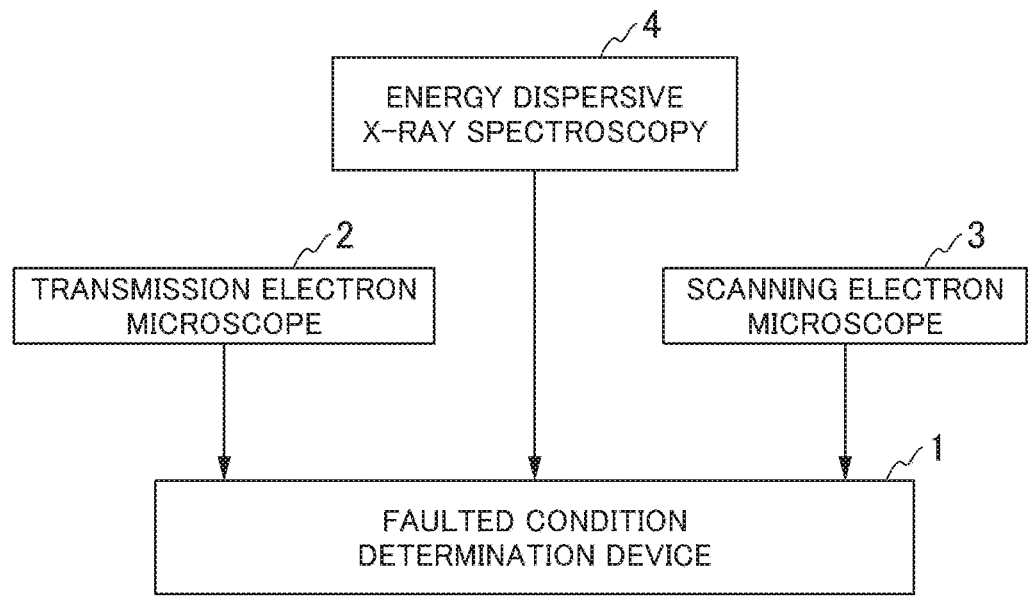
FIG. 1 is a configuration diagram of a maintenance system including a faulted condition determination device.

FIG. 1 is a configuration diagram of a maintenance system 100 including a faulted condition determination device 1 according to the embodiment of the present invention. In the maintenance system 100, the faulted condition determination device 1 to communicate with a transmission electron microscope 2, a scanning electron microscope 3, and an energy dispersive X-ray spectroscopy 4.

According to the present embodiment, the faulted condition determination device 1 adopts analysis results of a predetermined region at a boundary between a welded joint, which is produced by welding a high-strength ferrite steel and another steel using a weld material containing nickel, and the weld material for the high-strength ferrite steel, i.e. a very small region extending over a nickel-based weld material and a base material of the high-strength ferrite steel. Using the analysis results, the faulted condition determination device 1 detects a chromium content and a nickel content in a predetermined boundary region of the high-strength ferrite steel. In addition, the faulted condition determination device 1 determines the occurrence of ferrite bands according to analysis of micrographic images and the occurrence of creep voids at the predetermined boundary region according to analysis of micrographic images, and thereby the faulted condition determination device 1 calculates types of interfacial precipitation at the predetermined boundary region and the precipitate region representing the occupied region of interfacial precipitation according to analysis of micrographic images. Accordingly, the faulted condition determination device 1 determines the faulted condition of the predetermined boundary region according to at least three factors among five factors such as the chromium content at the predetermined boundary region, the nickel content at the predetermined boundary region, the ferrite bands, the creep voids, and the precipitate region. According to the present embodiment, the high-strength ferrite steel may contain chromium at 9%. In this connection, the high-strength ferrite steel may have a chromium content ranging from 9% to 12%. For example, FIG. 11 shows chemical compositions of a high-strength ferrite steel having a chromium content of 9% and a nickel-based weld material according to the present embodiment.

Figure 2:
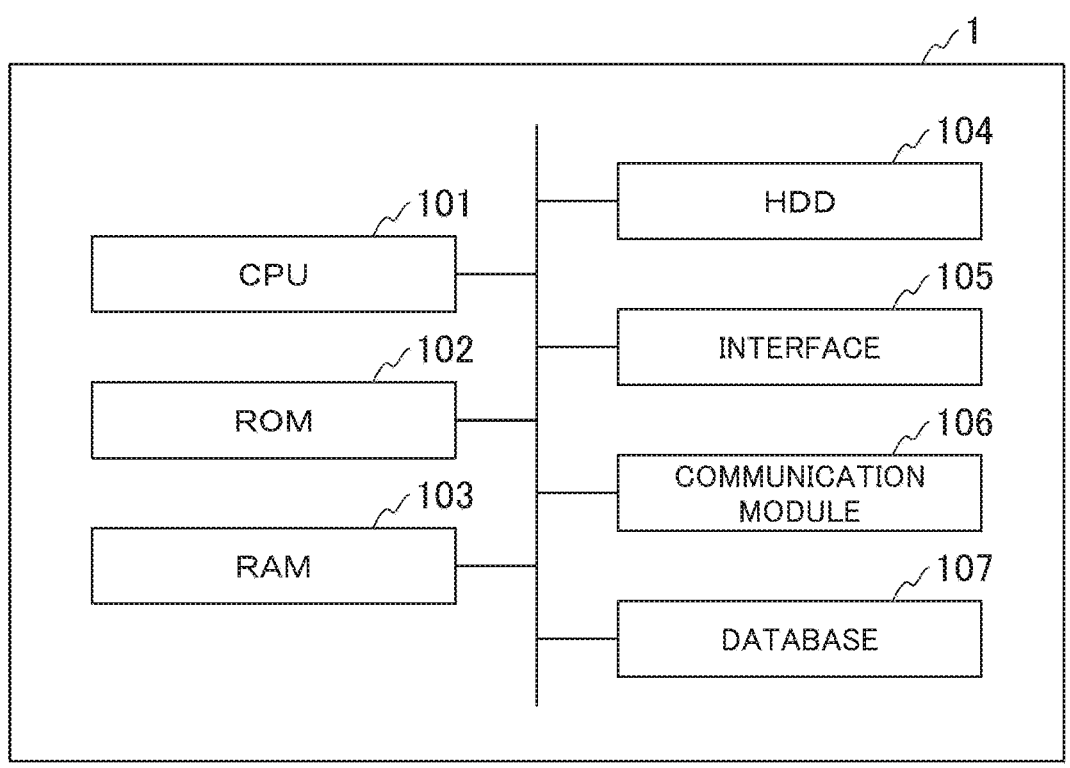
FIG. 2 is a block diagram showing a hardware configuration of a faulted condition determination device.

FIG. 2 is a block diagram showing a hardware configuration of the faulted condition determination device according to the present embodiment. The faulted condition determination device 1 is a computer including a CPU 101, a ROM (Read-Only Memory) 102, a RAM (Random-Access Memory) 103, a storage unit such as a hard-disk drive (HDD) 104, a user interface 105, a communication module 106, and a database 107.

Figure 3:
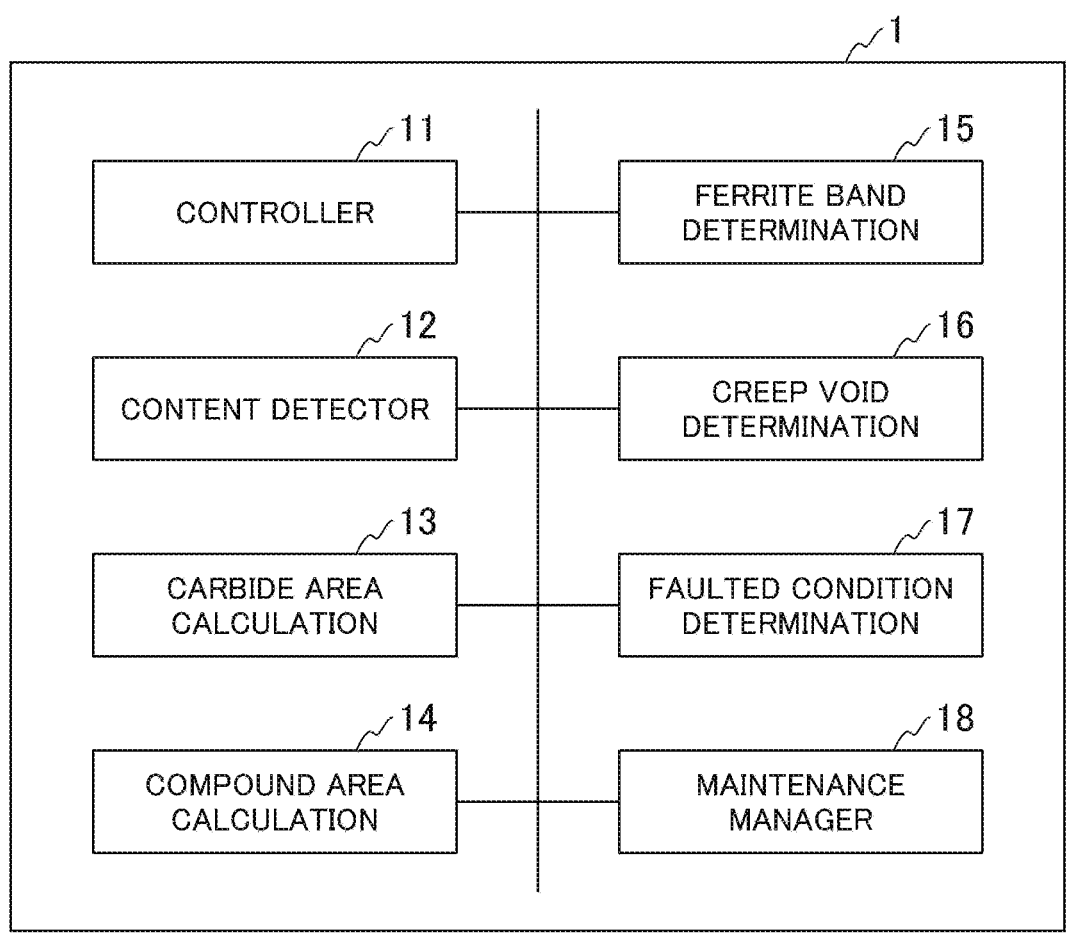
FIG. 3 is a functional block diagram of the faulted condition determination device 1 according to the embodiment of the invention.

FIG. 3 is a functional block diagram of the faulted condition determination device 1 according to the present embodiment. In the faulted condition determination device 1, the CPU 101 executes faulted-condition determination programs stored on the ROM 102 according to user operations. Thus, the faulted condition determination device 1 implements functional parts such as a controller 11, a content detector 12, a carbide area calculation part 13, a compound area calculation part 14, a ferrite band determination part 15, a creep void determination part 16, a faulted condition determination part 17, and a maintenance manager 18.

The controller 11 controls the functional parts. The content detector 12 obtains from the energy dispersive X-ray spectroscopy 4 the results of energy dispersive X-ray analysis at a predetermined boundary region of welding of a high-strength ferrite steel in a welded joint, in which the high-strength ferrite steel and another steel are welded together using a weld material containing nickel, i.e. a very small region extending over a nickel-based weld material and a base material of the high-strength ferrite steel. Using the results of energy dispersive X-ray analysis, the content detector 12 detects a chromium content and a nickel content at the predetermined boundary region of the high-strength ferrite steel. For example, the content detector 12 may detect a chromium content and a nickel content according to another method using an electron microanalyzer.

The carbide area calculation part 13 is one example of a precipitate region calculation part. The carbide area calculation part 13 calculates a carbide area representing an occupied region of carbide at the predetermined boundary region according to analysis of electron-microscopic images such as transmission electron-microscopic images and scanning electron-microscopic images.

The compound area calculation part 14 is another example of a precipitate region calculation part. The compound area calculation part 14 calculates a compound area representing an occupied region of intermetallic compounds at the predetermined boundary region according to analysis of electron-microscopic images such as transmission electron-microscopic images.

The ferrite band determination part 15 determines the occurrence of ferrite bands according to analysis of microscopic images such as transmission electron-microscopic images and scanning electron-microscopic images, electron backscattering analysis or the like.

The creep void determination part 16 determines the occurrence of creep voids according to analysis of electron-microscopic images such as scanning electron-microscopic images or analysis of optical microscopic images.

The faulted condition determination part 17 determines faulted conditions at a predetermined boundary region of a high-strength ferrite steel.

The maintenance manager 18 outputs maintenance information according to faulted conditions.

Figure 4:
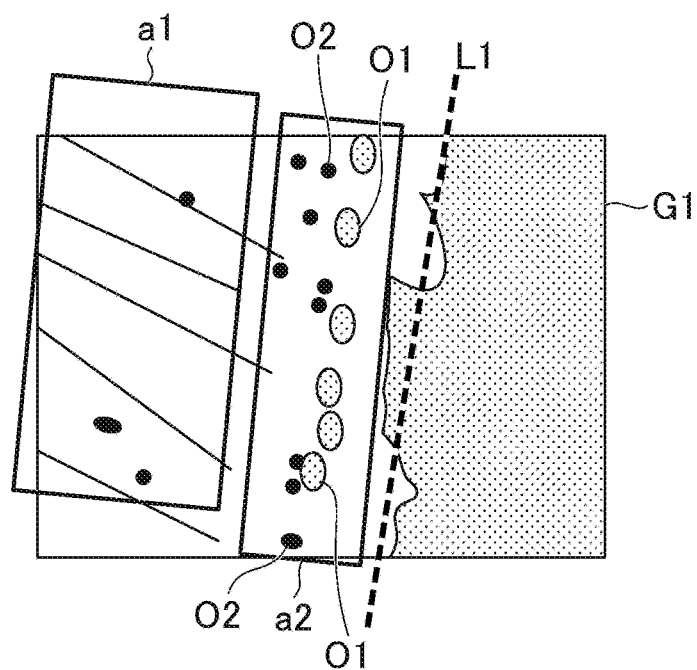
FIG. 4 shows an example of a TEM image produced by a transmission electron microscope.

FIG. 4 shows an example of a TEM image (where "TEM" stands for Transmission Electron Microscope) produced by a transmission electron microscope. FIG. 4 shows a TEM image G1 in which a left region from a boundary L1 shown by a dotted line indicates a high-strength ferrite steel while a right region proximate to or from the boundary L1 a nickel-based weld material. The boundary L1 is laid between the high-strength ferrite steel and the nickel-based weld material. The TEM image G1 is produced using the transmission electron microscope 2 capturing an image of welding of a replacement part of piping (or a welded joint) in which a high-strength ferrite steel and an austenite stainless steel are welded together using a nickel-based weld material. In FIG. 4, it is possible to detect precipitation of an intermetallic compound O1 and a carbide/carbon-nitride (hereinafter, simply referred to as a carbide O2) in the left region of the TEM image G1 from the boundary L1. In this connection, FIG. 4 shows an example of the TEM image G1 in which a faulted condition of welding has been deteriorated to some extent. In this case, it is possible to observe precipitation of the carbide O2 and the intermetallic compound O1 along the boundary L1 in the high-strength ferrite steel proximate to the boundary L1. The precipitate region of the intermetallic compound O1 may emerge in the high-strength ferrite steel proximate to the boundary L1. According to energy dispersive X-ray analysis, the faulted condition determination device 1 analyzes a first boundary region a1 apart from the boundary L1 by a first distance in the TEM image G1, thus measuring a chromium content and a nickel content according to analysis results. In this connection, the carbide O2 may be made of $M_{23}C_6$ while the intermetallic compound O1 may be a G-phase compound. In addition, the faulted condition determination device 1 analyzes a second boundary region a2 apart from the boundary L1 by a second distance in the TEM image G1, thus calculating areas of the carbide O2 and the intermetallic compound O1. The second boundary region a2 is closer to the boundary L1 than the first boundary region a1. The size of the first boundary region a1 and the second boundary region a2 are estimated via measurement in advance while the first distance and the second distance are estimated via measurement in advance.

Figure 5:
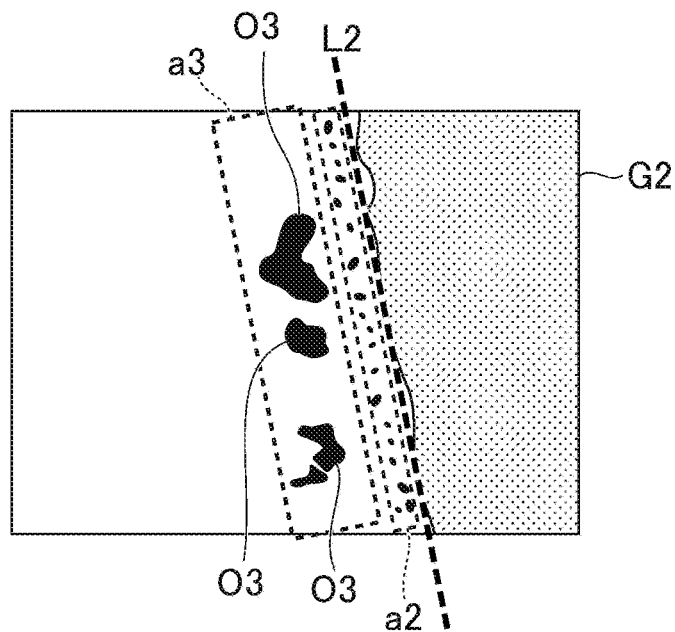
FIG. 5 shows an example of an SEM image produced by a scanning electron microscope.

FIG. 5 shows an example of an SEM image (where "SEM" stands for Scanning Electron Microscope) produced by a scanning electron microscope. FIG. 5 shows an SEM image G2 in which a left region from a boundary L2 shown by a dotted line indicates a high-strength ferrite steel while a right region from the boundary L2 indicates a nickel-based weld material. The SEM image G2 is produced using the scanning electron microscope 3 capturing an image of welding of a replacement part of piping (or a welded joint), in which a high-strength ferrite steel and an austenite stainless steel are welded together using a nickel-based weld material. Similar to the TEM image G1 shown in FIG. 4, FIG. 5 shows an example of the SEM image G2 in which a faulted condition of welding has been deteriorated to some extent. In FIG. 5, it is possible to observe creep voids O3 in the left region of the SEM image G2 from the boundary L2. The creep voids O3 occur in a third boundary region a3 of a high-strength ferrite steel in proximity to the boundary L2. The third boundary region a3 is apart from the boundary L2 by a third distance. The size of the third boundary region a3 and the third distance are estimated via measurement in advance. In this connection, the position of the first boundary region a1 relative to the boundary L1 may be equivalent to the position of the third boundary region a3 relative to the boundary L2. In FIG. 5, the second boundary region a2 is laid between the third boundary region a3 and the boundary L2. The precipitation of the intermetallic compound O1 and the carbide O2 may occur in the second boundary region a2 since a replacement part is exposed to a high-temperature environment for a long period of time.

FIG. 6A shows analysis results of a TEM image G1-1. In FIG. 6A, two graphs are depicted in relation to the TEM image G1-1 representative of welding of an unused replacement part (i.e. a replacement part of a first stage (I)), i.e. a nickel content graph G1-11 and a chromium content graph G1-12. The horizontal axis of the nickel content graph G1-11 relates to pixels of the TEM image G1-1 in the horizontal direction while the vertical axis of the nickel content graph G1-11 represents statistical values of pixels of the TEM image G1-1 in the vertical direction with respect to the nickel content. It is possible to substitute average values for statistical values. Similarly, the horizontal axis of the chromium content graph G1-12 relates to pixels of the TEM image G1-1 in the horizontal direction while the vertical axis of the chromium content graph G1-12 represents statistical values of pixels of the TEM image G1-1 in the vertical direction with respect to the chromium content. It is possible to substitute average values for statistical values.

FIG. 6B shows analysis results of a TEM image G1-2. In FIG. 6B, two graphs are depicted in relation to the TEM image G1-2 representative of welding of a replacement part deteriorated in its faulted condition (i.e. a replacement part of a fourth stage (IV)), i.e. a nickel content graph G1-21 and a chromium content graph G1-22. The horizontal axis of the nickel content graph G1-21 relates to pixels of the TEM image G1-2 in the horizontal direction while the vertical axis of the nickel content graph G1-21 represents statistical values of pixels of the TEM image G1-2 in the vertical direction with respect to the nickel content. It is possible to substitute average values for statistical values. Similarly, the horizontal axis of the chromium content graph G1-22 relates to pixels of the TEM image G1-2 in the horizontal direction while the vertical axis of the chromium content graph G1-22 represents statistical values of pixels of the TEM image G1-2 in the vertical direction with respect to the chromium content. It is possible to substitute average values for statistical values.

Through comparison between the graphs G1-11 and G1-21 and between the graphs G1-12 and G1-22, it is possible to determine that the nickel and chromium contents for the replacement part deteriorated in the faulted condition in proximity the boundary L1 of a high-strength ferrite steel are higher than those of the unused replacement part. The graph G1-21 shows that the nickel content peaks in its value in the high-strength ferrite steel proximate to the boundary L1 while the graph G1-22 shows that the chromium content peaks in its value in the high-strength ferrite steel proximate to the boundary L1. This is because precipitation of G-phase intermetallic compounds. Through comparison between the graphs G1-12 and G1-22 and between the graphs G1-11 and G1-21, it is possible to determine that the replacement part deteriorated in the faulted condition indicates an increase of the nickel content and a decrease of the chromium content in the high-strength ferrite steel proximate to the boundary L1. Due to the long-time usage under high-temperature environments, nickel atoms and chromium atoms would be diffused from the weld material to the high-strength ferrite steel at the boundary between the high-strength ferrite steel and the weld material containing nickel. This may lead to precipitation of the intermetallic compounds O1 with main components of nickel and chromium and the carbides O2 in the high-strength ferrite steel proximate to the boundary L1, thus causing a reduction of the chromium content around precipitation in the high-strength ferrite steel. In addition, diffusion of nickel from the weld material may cause an increase of the nickel content over the entirety of the high-strength ferrite steel. Those variations of the nickel and chromium contents in the predetermined boundary region (e.g. the second boundary region a2) may be correlated to the faulted condition of the replacement part, and therefore it is possible to determine the faulted condition of the replacement part by detecting the nickel and chromium contents in the predetermined boundary region.

Figure 7:
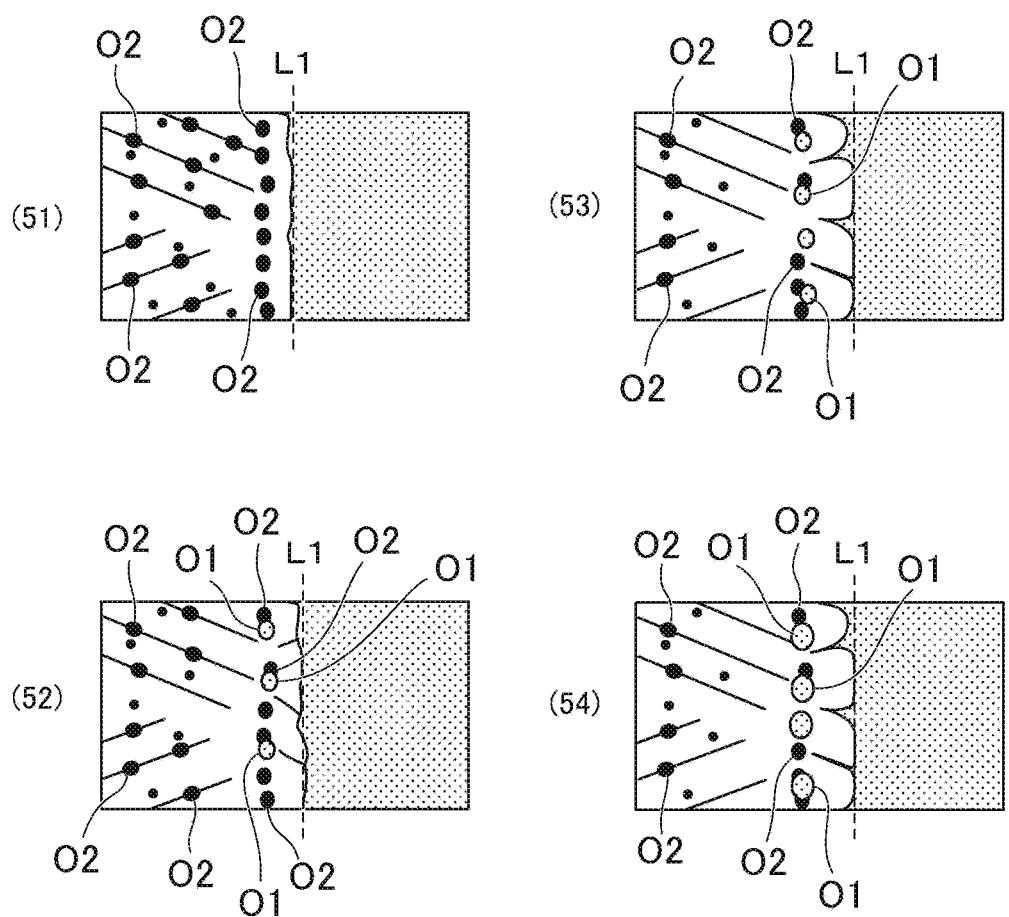
FIG. 7 shows variations of TEM images at various stages of faulted conditions

FIG. 7 shows variations of TEM images at various stages of faulted conditions. FIG. 7 shows four variations of TEM images in each of four stages 51-54, wherein the faulted condition of welding of a replacement part is classified into the first stage (I) through the fourth stage (IV).

In the first stage (I) 51 of the TEM image G1 for the unused replacement part, the high-strength ferrite steel in the left side of the boundary L1 includes precipitation of carbides O2 along the boundary L1 in proximate to the boundary L1. In the first stage (I) 51 of the TEM image G1, the carbides O2 are diffused over the entirety of the high-strength ferrite steel.

The second stage (II) 52 shows the TEM image G1 representing an initial faulted condition of a replacement part after used in high-temperature environments, wherein it is possible to observe that the high-strength ferrite steel in the left side of the boundary L1 includes precipitation of intermetallic compounds O1 together with carbides O2 along the boundary L1 in proximity the boundary L1. The second stage (II) 52 of the TEM image G1 indicates a reduction of carbides O2 in the high-strength ferrite steel in comparison with the first stage (I) 51 of the TEM image G1. Specifically, the second stage (II) 52 shows precipitation of intermetallic compounds O1 along the boundary L1 in proximity to the boundary L1, whereas the area of carbides O2 is larger than the area of intermetallic compounds O1 (where carbide area intermetallic compound area). In addition, the second stage (II) 52 shows slight formation of ferrite bands in the high-strength ferrite steel in proximity to the boundary L1.

The third stage (III) 53 shows the TEM image G1 representing the faulted condition of a replacement part used under high-temperature environments, which is deteriorated in comparison with the second stage (II) 52. In the third stage (III) 53, it is possible to observe that the high-strength ferrite steel in the left side of the boundary L1 includes precipitation of intermetallic compounds O1 together with carbides O2 along the boundary L1 in proximity to the boundary L1, wherein the area of intermetallic compounds O1 is increased in the third stage (III) 53 rather than the second stage (II) 52. In addition, the amount of carbides O2 included in the high-strength ferrite steel is reduced in the third stage (III) 53 rather than the second stage (II) 52. Specifically, similar to the second stage (II) 52, the area of carbides O2 precipitating along the boundary L1 in proximity to the boundary L1 is still larger than the area of intermetallic compounds O1 (where carbide area≥intermetallic compound area). In addition, the third stage (III) 53 indicates growth and enlargement of ferrite bands in the high-strength ferrite steel in proximity to the boundary L1. Moreover, it is possible to detect the occurrence of creep voids in the predetermined boundary region in the third stage (III) 53.

The chromium content for each unit area in the predetermined boundary region is 8% or above in the first stage (I) 51, the second stage (II) 52, and the third stage (III) 53. In addition, the nickel content for each unit area in the predetermined boundary region is less than 0.4% in the first stage (I) 51, the second stage (II) 52, and the third stage (III) 53.

The fourth stage (IV) 54 shows the TEM image G1 representing the faulted condition of a replacement part used under high-temperature environments, which is further deteriorated in comparison with the third stage (III) 53. Similar to the third stage (III) 53, it is possible to observe that the high-strength ferrite steel in the left side of the boundary L1 includes precipitation of intermetallic compounds O1 together with carbides O2 along the boundary L1 in proximity to the boundary L1, wherein the area of intermetallic compounds O1 is increased in the fourth stage (IV) 54 rather than the third stage (III) 53. In addition, the amount of carbides O2 is decreased in the fourth stage (IV) 54 in comparison with the second stage (II) 52 and the third stage (III) 53. Specifically, the area of intermetallic compounds O1 precipitating along the boundary L1 in proximity to the boundary L1 becomes larger than the area of carbides O2. In addition, the fourth stage (IV) 54 indicates growth and enlargement of ferrite bands in the high-strength ferrite steel proximate to the boundary L1. Moreover, it is possible to detect creep voids in the predetermined boundary region in the fourth stage (IV) 54, wherein the area of creep voids is larger than the area of creep voids in the third stage (III) 53.

In the fourth stage (IV) 54, the chromium content for each unit area in the predetermined boundary region is less than 8%. In the fourth stage (IV) 54, the nickel content for each unit area in the predetermined boundary region is 0.4% or more.

FIG. 8 shows a classification table showing various stages of faulted conditions. As shown in FIG. 8, the first stage (I) 51 indicates interfacial precipitation in the predetermined boundary region, i.e. carbides O2, no ferrite bands, and no creep voids together with a chromium content of 8.0% or more, and a nickel content of less than 0.4%.

The second stage (II) 52 indicates interfacial precipitation in the predetermined boundary region, i.e. carbides O2, intermetallic compounds O1, ferrite bands which grow at a low rate but do not enlarge in size, and no creep voids together with the chromium content of 8.0% or more, and the nickel content of less than 0.4%. In this connection, the second stage (II) 52 indicates the relationship between interfacial precipitation areas in the predetermined boundary region, i.e. carbide area intermetallic compound area.

The third stage (III) 53 indicates interfacial precipitation in the predetermined boundary region, i.e. carbides O2, intermetallic compounds O1, ferrite bands which grow and enlarge in size, and creep voids together with the chromium content of 8.0% or more, and the nickel content of less than 0.4%. In this connection, the third stage (III) 53 indicates the relationship between interfacial precipitation areas in the predetermined boundary region, i.e. carbide area intermetallic compound area.

The fourth stage (IV) 54 indicates interfacial precipitation in the predetermined boundary region, i.e. carbides O2, intermetallic compounds O1, ferrite bands which grow and enlarge in size, and creep voids together with the chromium content of less than 8.0%, and the nickel content of 0.4% or more. In this connection, the fourth stage (IV) 54 indicates the relationship between interfacial precipitation areas in the predetermined boundary region, i.e. carbide area<intermetallic compound area.

In the present embodiment, the intermetallic compounds O1 and the carbides O2 precipitating on the surface of the high-strength ferrite steel proximate to the boundary L1 will be defined as interfacial precipitation.

Figure 9:
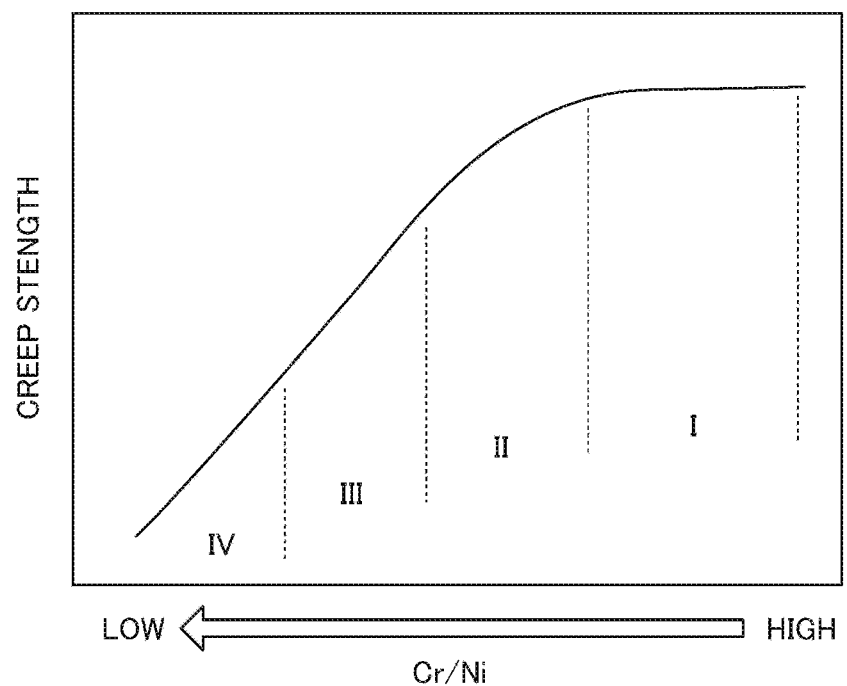
FIG. 9 shows the relationship between creep strength and the ratio of the chromium content to the nickel content.

FIG. 9 shows the relationship between creep strength and a ratio of the chromium content to the nickel content. FIG. 9 shows that the creep strength decreases to deteriorate the faulted condition as a ratio of the chromium content to the nickel content decreases.

Figure 10:
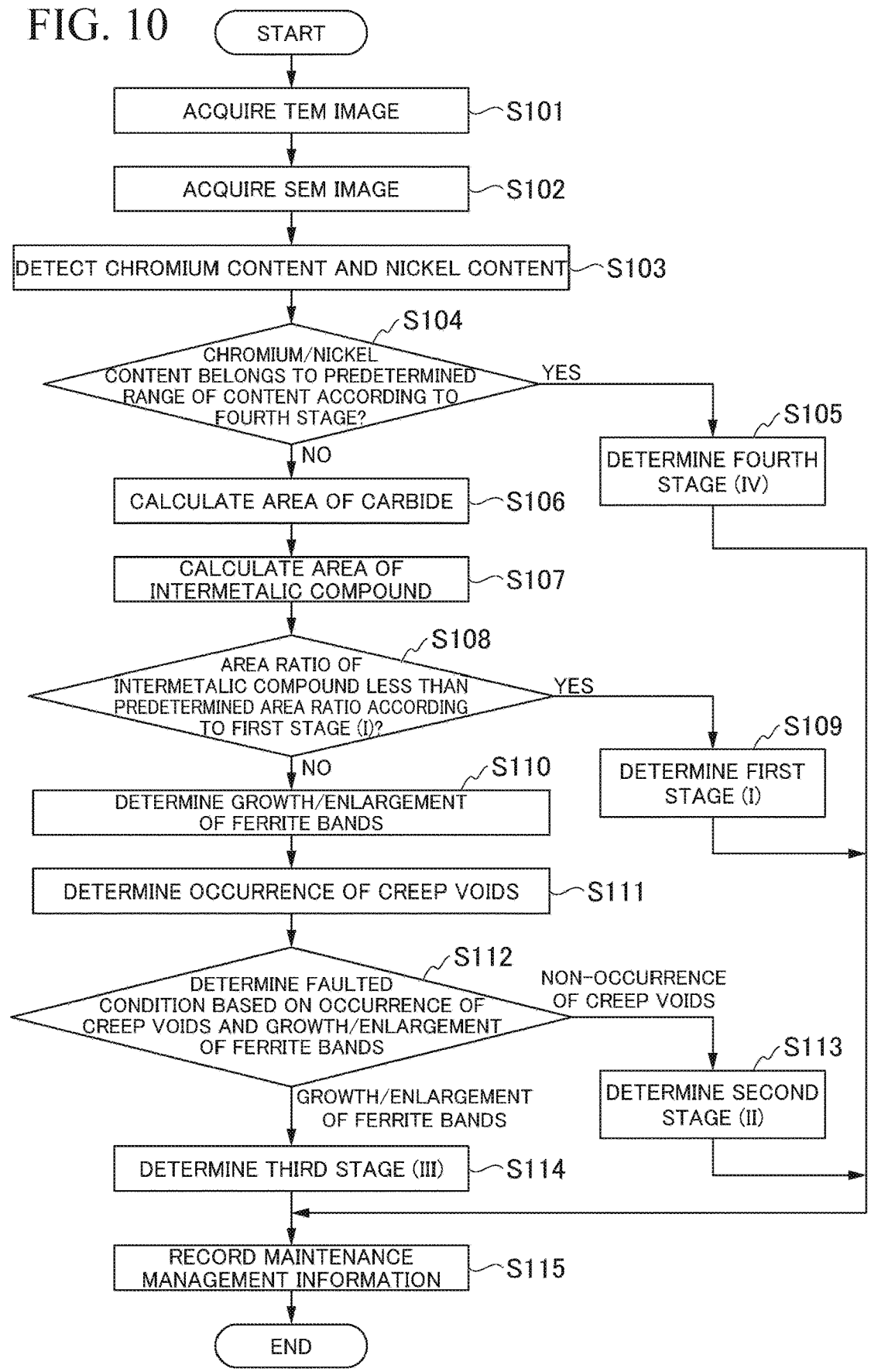
FIG. 10 is a flowchart showing a faulted condition determination process of the faulted condition determination device.

FIG. 10 is a flowchart showing a faulted condition determination process of the faulted condition determination device 1. Next, the processing of the faulted condition determination device 1 will be described with reference to the flowchart (i.e. steps S101 through S115). The faulted condition determination device 1 acquires a TEM image G1 using the transmission electron microscope 2 (S101). In addition, the faulted condition determination device 1 acquires an SEM image G2 using the scanning electron microscope 3 (S102). It is possible to obtain the TEM image G1 after obtaining the SEM image G2. The controller 10 of the faulted condition determination device 1 starts to carry out a faulted condition determination process upon a user operation.

Upon starting the faulted condition determination process, the content detector 12 acquires the TEM image G1. Through image processing of the TEM image G1, the content detector 12 detects the boundary L1 between a high-strength ferrite steel and a nickel-based weld material using color pixel values. The content detector 12 specifies the first boundary region a1 shown in FIG. 4 based on the boundary L1, thus outputting coordinates of the first boundary region a1 to the energy dispersive X-ray spectroscopy 4. In this connection, it is possible to specify the first boundary region a1 based on the predetermined distance and its range which are determined based on the position of the boundary L1. Alternatively, it is possible to specify the first boundary region a1 using previous data collected in the past. The energy dispersive X-ray spectroscope 4 produces an elementary content profile of the first boundary region a1, thus outputting the elementary content profile to the faulted condition determination device 1. Using the elementary content profile, the content detector 12 detects the chromium content and the nickel content in the first boundary region a1 shown in FIG. 4 (S103). In this connection, pixel values relating to the high-strength ferrite steel and the nickel-based weld material were determined via experiments in advance.

Based on the TEM image G1, the content detector 12 may produce the nickel-content graphs G1-11 and G1-21 and the chromium-content graphs G1-12 and G1-22 shown in FIGS. 6A-6B. In addition, the content detector 12 may output the nickel-content graphs G-12 and G1-21 and the chromium-content graphs G1-12 and G1-22 to a monitor.

The faulted condition determination part 17 determines whether the chromium content and/or the nickel content belongs to a predetermined range of content according to the fourth stage (S104). Specifically, the faulted condition determination part 17 determines whether the chromium content is less than 8.0% (i.e. a first lower threshold) and whether the nickel content is equal to 0.4% (i.e. a second lower threshold) or more. The faulted condition determination part 17 determines that the faulted condition of welding of a replacement part belongs to the fourth stage (IV) when the chromium content is less than 8.0% while the nickel content is equal to 0.4% or more (S105). The fourth stage (IV) corresponds to a replacement consideration state in which a user should consider whether to change a replacement part with another part. When the chromium content is equal to 8.0% (i.e. the first lower threshold) or more while the nickel content is less than 0.4% (i.e. the second lower threshold), the faulted condition determination part 17 may determine any one of faulted conditions according to the first stage (I) through the third stage (III). The first stage (I) through the third stage (III) correspond to a replacement standby stage for a replacement part subjected to fault determination. The replacement standby state may be classified into two or more faulted conditions.

The carbide area calculation part 13 specifies the second boundary region a2 shown in FIG. 4 based on the boundary L1. In this connection, it is possible to specify the second boundary region a2 based on the predetermined distance and its range, which are determined based on the position of the boundary L1 in advance. Alternatively, it is possible to specify the second boundary region a2 using previous data collected in the past. As the faulted condition deteriorates, the intermetallic compounds O1 may be precipitated in the second boundary region a2. The carbide calculation part 13 calculates the area of carbides O2 based on pixel values of the second boundary region a2 (S106). As the faulted condition deteriorates, the intermetallic compounds O1 may be precipitated in the second boundary region a2. The compound area calculation part 14 calculates the area of metallic compounds O1 based on pixel values of the second boundary region a2 (S107). In this connection, pixel values relating to the carbides O2 and the metallic compounds O1 were determined via experiments in advance.

The faulted condition determination part 17 determines whether an area ratio of the intermetallic compounds O1 in the second boundary region a2 is less than a predetermined area ratio according to the first stage (I) (S108). The faulted condition determination part 17 determines the faulted condition of welding of a replacement part according to the first stage (I) (S109) when the area ratio of the intermetallic compounds O1 is less than the predetermined area ratio according to the first stage (I). The first stage (I) corresponds to the replacement standby state (e.g. longitudinal observation).

Next, the ferrite band determination part 15 determines the occurrence of ferrite bands in the region proximate to the boundary L1 based on the TEM image G1. Upon determining the occurrence of ferrite bands, the ferrite band determination part 15 determines whether ferrite bands grow and enlarge in size (S110). For the sake of determination processes, for example, it is possible to adopt machine learning and/or pattern recognition using images such that the ferrite band determination part 15 can determine the occurrence of ferrite bands and the growth/enlargement of ferrite bands.

The creep void determination part 16 detects the boundary L1 based on the SEM image G2 and thereby specifies the third boundary region a3 shown in FIG. 5 based on the boundary L1. In addition, the creep void determination part 16 determines the occurrence of creep voids in the third boundary region a3 proximate to the boundary L1 (S111). For the sake of the determination process, for example, the creep void determination part 16 may determine the occurrence of creep voids in the third boundary region a3 of the SEM image G2 based on pixel values of the SEM region G2.

According to the result of determining the growth/enlargement of ferrite bands and the result of determining the occurrence of creep voids, the faulted condition determination part 17 determines whether the faulted condition of welding of a replacement part belongs to the second stage (II) or the third stage (III) (S112). Specifically, due to absence of creep voids, the faulted condition determination part 17 determines that the faulted condition belongs to the second stage (II) (S113). The second stage (II) corresponds to the replacement standby state indicating that a replacement part would be inspected in the next periodic inspection. Upon determining the growth/enlargement of ferrite bands, the faulted condition determination part 17 determines that the faulted condition of welding of a replacement part belongs to the third stage (III) (S114). The third stage (III) corresponds to the replacement standby state indicating that a replacement part would be changed with another one in the next periodic inspection.

The faulted condition determination part 17 acquires various parameters such as the chromium content and the nickel content in the first boundary area a1, the area of carbides O2, the area of intermetallic compounds O1, absence/existence of ferrite bands, growth of ferrite bands, and absence/existence of creep voids in the second boundary region a2, thus determining that the faulted condition belongs to any one of the first stage (I) 51 through the fourth stage (IV) 54. In this connection, the faulted condition determination part 17 may output the determination result, relating to any one of the first stage (I) 51 through the fourth stage (IV) 54, to a monitor or the like.

The faulted condition determination part 17 determines that the faulted condition of welding of a replacement part belongs to the first stage (I) when the second boundary region a2 solely includes the carbides O2 as interfacial precipitation (or an area of intermetallic compounds O1 is equal to a predetermined area or less), the first boundary region a1 has the chromium content of 8% or more while the first boundary region a1 has the nickel content of less than 0.4%. Using at least one of those parameters, the faulted condition determination part 17 may determine that the faulted condition of welding of a replacement part belongs to the first stage (I).

The faulted condition determination part 17 determines that the faulted condition of welding of a replacement part belongs to the second stage (II) when the second boundary region a2 has an inequality of carbide area intermetallic area between the areas of carbides O2 and intermetallic compounds O1 serving as interfacial precipitation, the second boundary region a2 has slight existence of ferrite bands and absence of creep voids while the first boundary region a1 has the chromium content of 8% or more and the nickel content of less than 0.4%. Using at least one of those parameters, the faulted condition determination part 17 may determine that the faulted condition of welding of a replacement part belongs to the second stage (II).

The faulted condition determination part 17 determines that the faulted condition of welding of a replacement part belongs to the third stage (III) when the second boundary region a2 has an inequality of carbide area intermetallic compound area between the areas of carbides O2 and intermetallic compounds O1 serving as interfacial precipitation, the second boundary region a2 has growth/enlargement of ferrite bands and existence of creep voids while the first boundary region a1 has the chromium content of 8% or more and the nickel content of less than 0.4%. Using at least one of those parameters, the faulted condition determination part 17 may determine that the faulted condition of welding of a replacement part belongs to the third stage (III).

The faulted condition determination part 17 determines that the faulted condition of welding of a replacement part belongs to the fourth stage (IV) when the second boundary region a2 has an inequality of carbide area<intermetallic compound area between the areas of carbides O2 and intermetallic compounds O1 serving as interfacial precipitation, the second boundary region a2 has growth/enlargement of ferrite bands and existence of creep voids while the first boundary region a1 has the chromium content of less than 8% and the nickel content of 0.4% or more. Using at least one of those parameters, the faulted condition determination part 17 may determine that the faulted condition of welding of a replacement part belongs to the fourth stage (IV).

The maintenance manager 18 stores the year, month, and date of inspection for each replacement on a database in advance. The maintenance manager 18 receive a user input to obtain an ID of each replacement part subjected to the faulted condition determination process. The maintenance manager 18 records the maintenance management information corresponding to the faulted condition in connection with the next year, month, and date of inspection tied with the ID of each replacement part on the database (S115). For example, the maintenance manager 18 records the information of "longitudinal observation" tied with the ID of each replacement part when the faulted condition belongs to the first stage (I). The maintenance manager 18 records the information "reinspection on the next periodical inspection" tied with the ID of each replacement part when the faulted condition belongs to the second stage (II). The maintenance manager 18 records the information of "replacement consideration on the next periodical inspection" tied with the ID of each replacement part when the faulted condition belongs to the third stage (III). The maintenance manager 18 records the information of "replacement consideration on the next inspection" (i.e. the replacement consideration state) tied with the ID of each replacement part when the faulted condition belongs to the fourth stage (IV). In short, the faulted condition determination device 1 determines the replacement standby state when the carbide area is larger than or roughly equal to the intermetallic area, but the faulted condition determination device 1 determines the replacement consideration state when the carbide area is smaller than the intermetallic area.

As described heretofore, according to the faulted condition determination process of the foregoing embodiment, it is possible to appropriately determine the faulted condition in a predetermined region proximate to welding of a replacement part in which a high-strength ferrite steel and another steel are welded together using a nickel-based weld material.

The faulted condition determination device 1 includes a computer system therein. The foregoing processes are stored on computer-readable storage media as programs. This makes it possible for a computer to read and execute programs and to thereby implement the foregoing processes. Herein, the term "computer-readable storage media" refers to magnetic disks, magneto-optical disks, CD-ROM, DVD-ROM, semiconductor memory, and the like. In addition, it is possible to deliver programs to computers through communication lines such that computers can receive and execute programs.

The foregoing programs may achieve part of the foregoing functions. Alternatively, the foregoing programs may be differential files (or differential programs), which are combined with pre-installed programs of computer systems to achieve the foregoing functions.

Lastly, the present invention is not necessarily limited to the foregoing embodiment, and therefore the present invention may embrace any modifications or any changes of design within the scope of the invention as defined in the appended claims.

What is claimed is:

1. A faulted condition determination method adapted to a welded joint in which a ferrite steel and another steel are welded together using a weld material containing nickel, comprising:
  detecting a chromium content and a nickel content in a predetermined boundary region, which are measured in the ferrite steel of the welded joint; and
  determining a faulted condition as a replacement standby state to standby regarding replacement of a replacement part when the chromium content is equal to a first lower threshold or more while the nickel content is less than a second lower threshold, the replacement part being a part that is made of the ferrite steel or the another steel; and
  determining the faulted condition as a replacement consideration state to consider replacement of the replacement part when the chromium content is less than the first lower threshold while the nickel content is equal to the second lower threshold or more.

2. The faulted condition determination method according to claim 1, wherein the replacement standby state is classified into at least two faulted conditions.

3. The faulted condition determination method according to claim 2, wherein the replacement standby state is classified into at least two faulted conditions selected from the group consisting of longitudinal observation of the welded joint, inspection on next periodical inspection, and replacement of the replacement part on the next periodical inspection.

4. The faulted condition determination method according to claim 1, further comprising:
  acquiring an image including the predetermined boundary region;
  calculating a precipitate region representing an occupied region of interfacial precipitation in the predetermined boundary region; and
  determining the faulted condition of the predetermined boundary region based on the precipitate region.

5. The faulted condition determination method according to claim 4, further comprising:
  calculating a carbide area representing an occupied region of carbides in the predetermined boundary region and an intermetallic compound area representing an occupied region of intermetallic compounds in the predetermined boundary region based on the image; and
  determining the faulted condition of the predetermined boundary region based on the carbide area and the intermetallic compound area.

6. The faulted condition determination method according to claim 5, further comprising:
  comparing the carbide area and the intermetallic compound area;
  determining the replacement standby state when the carbide area is equal to or larger than the intermetallic compound area; and
  determining the replacement consideration state when the carbide area is smaller than the intermetallic compound area.

7. The faulted condition determination method according to claim 5, further comprising:
  determining the faulted condition of the predetermined boundary region based on growth of ferrite bands detected from the image.

8. The faulted condition determination method according to claim 5, further comprising:
  determining the faulted condition of the predetermined boundary region based on absence/existence of creep voids in the predetermined boundary region detected from the image.

9. The faulted condition determination method according to claim 8, further comprising:
  detecting the chromium content and the nickel content in a first boundary region apart from the boundary by a first distance;
  detecting the carbides and the intermetallic compounds in a second boundary region apart from the boundary by a second distance smaller than the first distance; and
  detecting the creep voids in a third boundary region apart from the boundary by a third distance equal to the first distance.

* * * * *